March 11, 1930.  J. J. MILLER ET AL  1,750,187
POWER COASTER
Filed Jan. 28, 1929  2 Sheets-Sheet 2
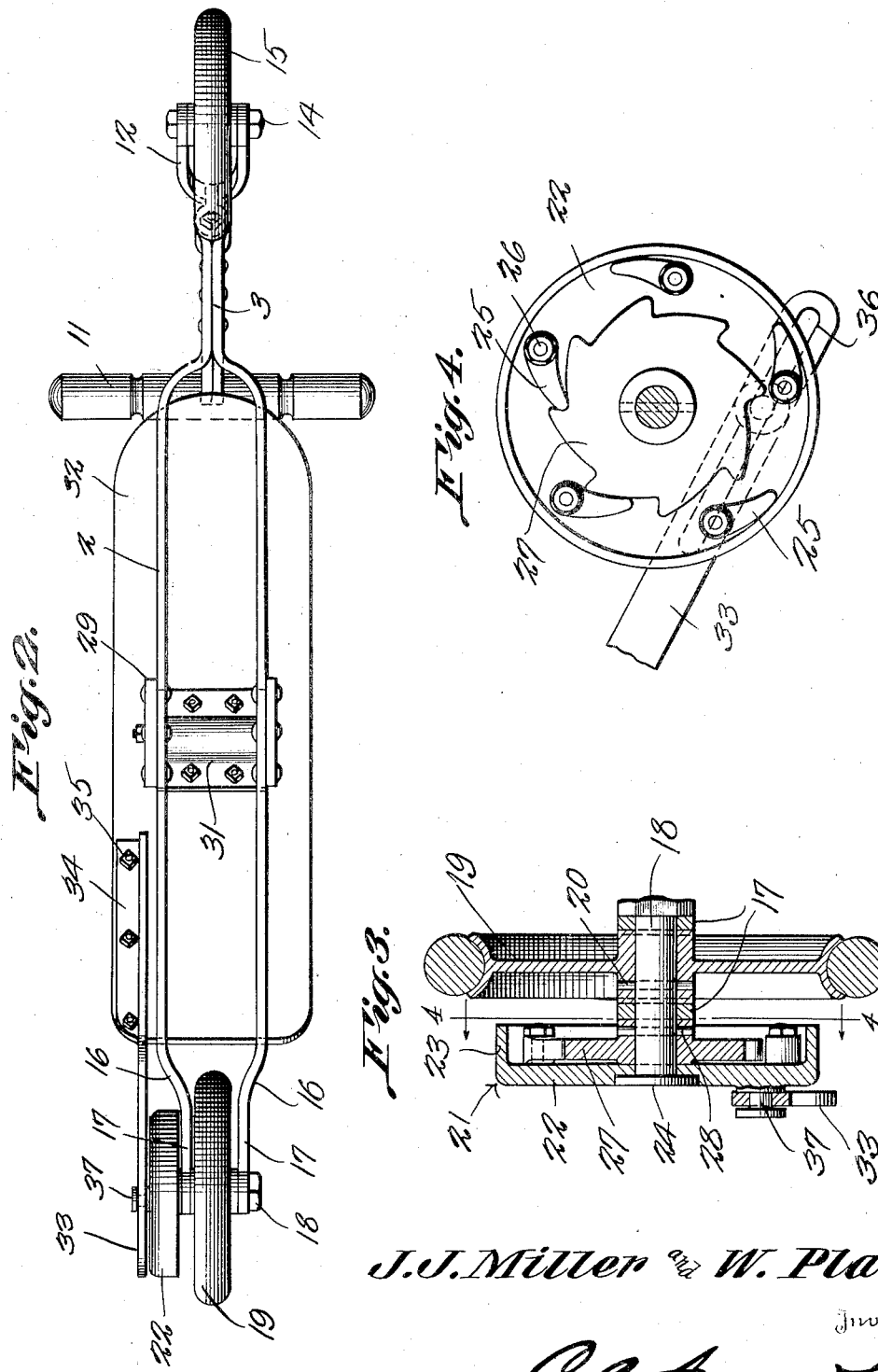
J.J. Miller and W. Platt
Inventors.
By C.A.Snow & Co.
Attorneys.

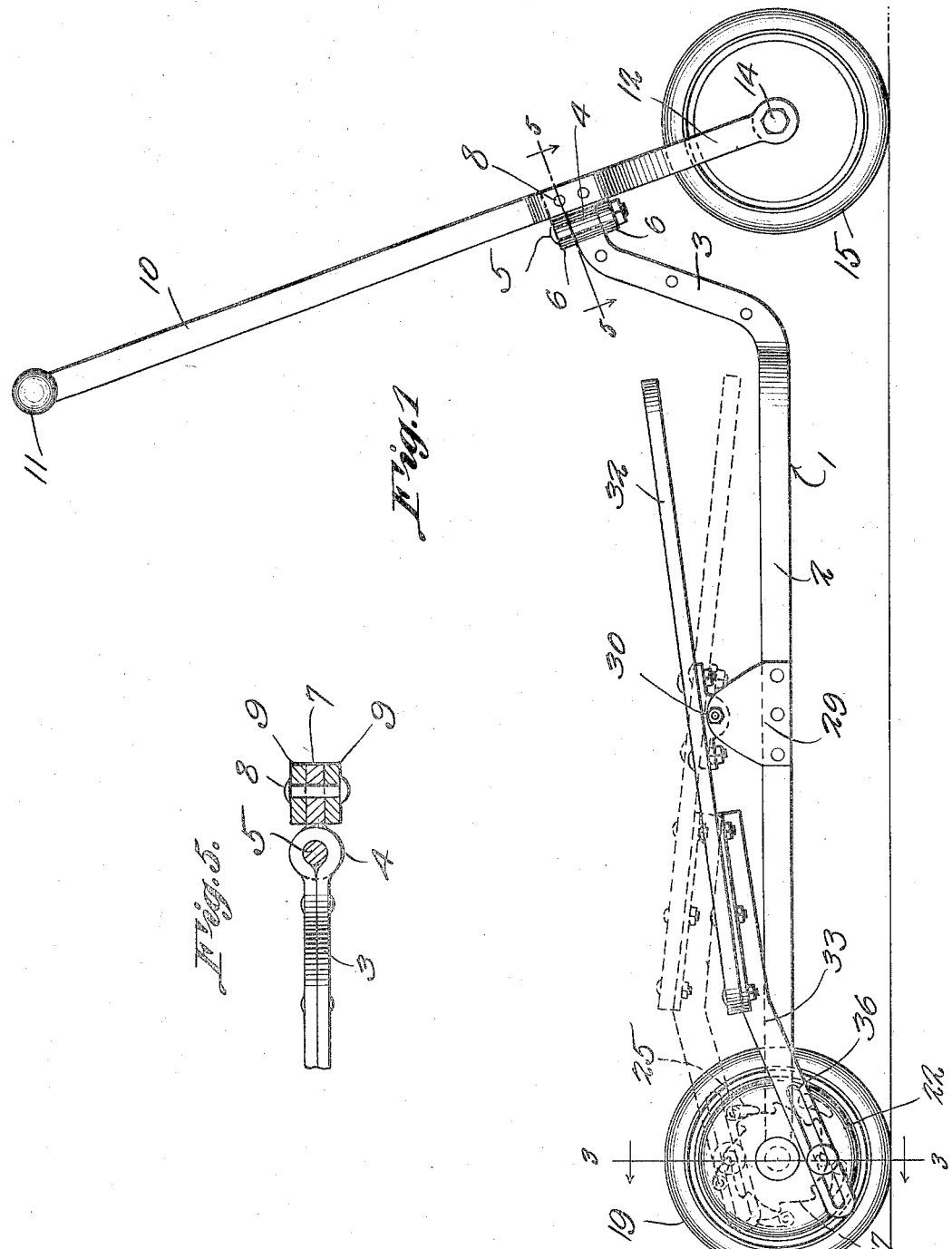

Patented Mar. 11, 1930

1,750,187

UNITED STATES PATENT OFFICE

JEROME J. MILLER AND WILLIAM PLATT, OF CHADRON, NEBRASKA

POWER COASTER

Application filed January 28, 1929. Serial No. 335,654.

This invention aims to provide a toy of the propelled coaster type, so constructed that the operator may apply power to it, or let it coast, as occasion may require.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention;

Figure 2 is a bottom plan;

Figure 3 is a section on the line 3—3 of Figure 1;

Figure 4 is an elevation of the ratchet mechanism;

Figure 5 is a section on the line 5—5 of Figure 1.

In carrying out the invention there is provided a frame designated, generally, by the numeral 1. The frame 1 includes a pair of parallel bars 2 which are brought together at their forward ends and extend upwardly to form a hanger 3, terminating in a bearing 4 receiving a bolt 5, or other pivot element, carried by rearwardly extended projections 6 on a block 7 secured at 8 between the constituent parts 9 of a steering shaft 10 provided at its upper end with a transverse handle 11, or the like. The lower ends of the parts 9 of the steering shaft 10 are spread to form a fork 12 carrying an axle 14 on which the forward wheel 15 of the vehicle is supported for rotation.

At their rear ends, the bars 2 of the frame 1 are contracted a little, as at 16, to form arms 17 in which is journaled a shaft 18 which may be a bolt. A rear wheel 19 is located between the arms 17 and is secured at 20 to the shaft 18.

Outside of one of the arms 17 is disposed a cup-shaped pawl wheel 21 including a body 22 and an overhanging and inwardly extended rim 23. The pawl wheel 21 is rotatable on the shaft 18 and is held on the shaft by a head 24 on one end of the shaft. Any desired number of pawls 25 are pivotally mounted at 26 on the body 22 of the pawl wheel 21, and are housed beneath the rim 23. The pawls 25 cooperate with a ratchet wheel 27 located within the cup-shaped wheel 21 and secured at 28 to the shaft 18.

Owing to the fact that the pawls 25 and the ratchet wheel 27 are located within the rim 23 of the pawl wheel 21, trash will not be likely to get entangled in the pawl and ratchet mechanism, and especially, the garments of the user of the vehicle will not be torn or dirtied, assuming that the user may take a posture in which the garments might get entangled with the pawl and ratchet mechanism if it were not for the presence of the rim 23.

A pair of brackets 29 are secured to the bars 2 of the frame 1, and upstand therefrom. The brackets 29 carry a fulcrum bolt 30 engaged with a bearing 31 secured to the bottom of a platform 32 at a point intermediate the ends of the platform. The platform 32 carries and includes a rearwardly extended arm 33 having a transverse flange 34 which is secured at 35 to the platform. The arm 33 has an elongated slot 36 in which works a pivot element 37 outstanding from the body 22 of the pawl wheel 21.

In practical operation, the steering of the vehicle is brought about in the usual way, by turning the steering shaft 10 through the instrumentality of the handle 11. The operator stands on the platform 32 and tilts the platform on its fulcrum 30. When the rear end of the platform 32 swings up and down, the pivot element 37 moves in the slot 36 of the arm 33 on the platform 32, and rotation is imparted to the pawl wheel 21. When the pawl wheel 21 is rotated, the pawls 25 rotate the ratchet wheel 27, and rotation is imparted to the shaft 18 and to the wheel 19, the vehicle thus being propelled. If the operator wishes to coast, he can simply hold the platform 32 still, whereupon the rear wheel 19 and the ratchet wheel 27 will rotate with respect to the pawls 25, the pawl wheel 21 remaining at rest.

The construction of the device is such that the operator can propel the vehicle or stand still and let it coast, as occasion may demand. The structure is simple in construction, inexpensive to manufacture and well adapted to withstand the severe use to which devices of the class described are put.

What is claimed is:—

1. In a device of the class described, a frame, a ground wheel journaled on the frame, a ratchet wheel connected to the ground wheel to turn therewith, a pawl wheel supported for rotation independently of the ratchet wheel, a pawl movably mounted on the pawl wheel and cooperating with the ratchet wheel, a platform tiltably mounted on the frame and including an arm having a slot, and a projection carried by the pawl wheel and movable in the slot.

2. In a device of the class described, a frame, a shaft journaled in the frame, a ground wheel secured to the shaft, a ratchet wheel secured to the shaft, a pawl wheel including a body and a laterally extended rim, the body of the pawl wheel being journaled on the shaft, a pawl movably mounted on the body of the pawl wheel and cooperating with the ratchet wheel, both the pawl and the ratchet wheel being housed within the rim of the pawl wheel, a platform tiltably mounted on the frame, and means for connecting the platform operatively with the pawl wheel.

In testimony that we claim the foregoing as our own, we have hereto affixed our signature.

JEROME J. MILLER.
WILLIAM PLATT.